United States Patent [19]

Shima et al.

[11] Patent Number: 4,725,960
[45] Date of Patent: Feb. 16, 1988

[54] METHOD OF SIZING AN IMAGE ON A GRAPHIC DISPLAY FOR A NUMERICAL CONTROLLER

[75] Inventors: Atsushi Shima, Suginami; Hideaki Inoue, Hino, both of Japan

[73] Assignee: Fanuc Ltd, Minamitsuru, Japan

[21] Appl. No.: 832,715

[22] PCT Filed: Jun. 28, 1985

[86] PCT No.: PCT/JP85/00364
§ 371 Date: Feb. 20, 1986
§ 102(e) Date: Feb. 20, 1986

[87] PCT Pub. No.: WO86/00429
PCT Pub. Date: Jan. 16, 1986

[30] Foreign Application Priority Data

Jun. 30, 1984 [JP] Japan .................. 59-136275

[51] Int. Cl.$^4$ ............................ G06F 15/46
[52] U.S. Cl. ..................... 364/474; 340/731; 340/825.23
[58] Field of Search .............. 364/167, 168, 169, 170, 364/171, 474, 475, 188, 189, 190, 521; 340/825.23, 731

[56] References Cited

U.S. PATENT DOCUMENTS

| | | | |
|---|---|---|---|
| 3,867,616 | 2/1975 | Korelitz et al. | 364/189 |
| 4,366,475 | 12/1982 | Kishi et al. | 364/521 |
| 4,627,003 | 12/1986 | Kishi et al. | 364/191 |

FOREIGN PATENT DOCUMENTS 0134895 3/1979 German Democratic Rep. .................. 340/731

*Primary Examiner*—Jerry Smith
*Assistant Examiner*—Allen MacDonald
*Attorney, Agent, or Firm*—Staas & Halsey

[57] ABSTRACT

The present invention is to enable the locus of a tool or the like to be drawn on a display screen (25) based on an NC command program on an optimum scale and as quickly as possible.

A microcomputer (10) obtains a magnification for image drawing and center coordinates of an image drawing space such that maximum and minimum coordinate values entered through a key input means (15) will be put in the display screen (25). Based upon such a magnification and center coordinates, the locus of a tool or the like is drawn on the display screen (25). In parallel with the above drawing process, the microcomputer (10) obtains maximum and minimum coordinate values of the NC command program. When a predetermined command is entered through the key input means (15) after completion of the above drawing process, the microcomputer (10) obtains such a magnification for image drawing and center coordinates of the image drawing space that the maximum and minimum coordinate values of the NC command program obtained in parallel with the above drawing process will be contained in the display screen (25). Based upon the thus obtained magnification and center coordinates, the locus of a tool or the like is drawn on the display screen (25).

Accordingly, when the maximum and minimum coordinate values input from the key input means (15) are appropriate, a satisfactory image can be drawn by the first drawing process. Even if the image by the first drawing process is not satisfactory, the locus of a tool or the like can be drawn in its entirety on the display screen (25) through second drawing process.

3 Claims, 3 Drawing Figures

METHOD OF SIZING AN IMAGE ON A GRAPHIC DISPLAY FOR A NUMERICAL CONTROLLER

BACKGROUND OF THE INVENTION

The present invention relates to an image drawing method of a graphic display for a numerical controller which draws an image, such as the locus of a tool, on a display screen based on interpreted contents of an NC command program.

In present-day numerical control (NC) equipment it is an important element how easily and surely an NC command program can be produced or checked, in addition to mere control of a machine tool by numerical control techniques.

An image drawing function is a technical solution to this problem, but it is necessary to improve various operating methods and functions according to the actual conditions of its application.

The image drawing function in the NC equipment is utilized mainly for verifying the operating state of an NC command program after editing (creating and correcting) it. This method has the following advantages over a method of verification by actually operating the machine tool.

(1) Even if the NC command program has an error, there is no danger of, for example, a collision between the machine tool and a workpiece, since the former is not in operation.

(2) The verification by the image drawing method is less time-consuming than the method involving the actual operation of the machine tool.

(3) Since machining is possible even in the image drawing process, utilization of the machine tool is efficient.

(4) Since the magnification for image drawing can be selected arbitrarily by changing the image drawing scale, the operating state of the program can easily be verified both in its entirety and in parts.

Incidentally, in order to verify the whole tool locus of such a shape and size as indicated by the curve 1 in FIG. 3, it is necessary to set a scale A on which the curve 1 will entirely go in a selected image drawing space on the display screen. In the case of an unknown NC command program, however, since maximum and minimum values of the tool locus on the image drawing axes (the X- and Y-axis in the illustrated example) are unknown, it is difficult to immediately determine the scale A.

In general, the scale for drawing an image is determined by setting the image drawing space (maximum and minimum values on each axis of the space) in accordance with the object of drawing (an NC command program), and the following methods have heretofore been employed therefor.

(1) The operator preinterprets the contents of the NC command program and sets maximum and minimum values of the image drawing space.

(2) At first, the NC equipment is caused by an "automatic start" function to obtain maximum and minimum values of the program concerned, and then an image is drawn using such a scale and center coordinates of the image drawing space that the maximum and minimum values will go in the space.

(3) Provisional maximum and minimum values for the image drawing space are set, on the basis of which an image is drawn. Then the operator gradually approaches optimum set values through use of functions such as "enlargement, reduction", "graphic form shift" and so forth while observing the image being displayed.

However, these methods possess such defects as follows:

DEFECT OF METHOD (1)

An analysis of the contents of a program by the operator is entirely different in nature from this kind of function as mentioned previously. That is, it is out of keeping with the purpose of developing a method which reduces the amount of knowledge necessary for programming and enables even a person of no expert knowledge to operate NC equipment with ease. Even to a person of such expert knowledge, it is troublesome to obtain the maximum and minimum values, and such work is virtually impossible when the NC command program is long. Accordingly, this method can be employed only when the maximum and minimum values are already known, or when the program is very simple.

DEFECT OF METHOD (2)

The most reliable method is to obtain the maximum and minimum values using the equipment itself. In this case, however, it is necessary to execute the program once for detecting the image drawing range, and this usually takes an amount of time equal to that for drawing an image. Therefore, in the case of a long NC command program, this method consumes much time prior to the image drawing process, and hence is impractical.

DEFECT OF METHOD (3)

The method of drawing an image at first using provisional set values is often employed in practice. In this instance, if a graphic form is drawn, even though only part of the form is on the display screen as in the case of a scale C in FIG. 3, it is possible to obtain appropriate set values in the next drawing process. Especially, in the case of NC equipment, since a program command will not exceed the movable range of the machine tool which is the controlled system, it is necessary only to set values of the movable range as the provisional set values. If, however, the provisional set values are inappropriate and the graphic form scarcely or does not at all appear in the image drawing space as in the case of a scale B in FIG. 3, the drawing process will be entirely useless.

SUMMARY OF THE INVENTION

The present invention offers a solution to the above problems of the prior art and has for its object to enable an optimum image drawing scale to be set as quickly as possible.

According to the present invention intended for settling the above-mentioned problems, a method of displaying the locus of a tool or the like on a graphic display for a numerical controller based on interpreted contents of an NC command program is arranged so that a magnification for drawing the image and the center coordinates of the image drawing space are obtained to make maximum and minimum coordinate values entered through a key input means go in the image drawing space; the tool locus or the like in a selected NC command program is drawn; maximum and minimum coordinate values of the selected NC command program are obtained in parallel with the drawing process; when a predetermined command is input after completion of the drawing process, a magnification for image drawing and center coordinates of the image drawing space are obtained to make the maximum and minimum coordinate values obtained during the drawing process go in the image drawing space; and the tool locus or the like in the selected program is drawn accordingly.

If the provisional maximum and minimum coordinate values entered through the key input means are appropriate set values corresponding to the selected NC command program, then a satisfactory image can be obtained through a single drawing process. When the set values are inappropriate, the tool locus or the like will not be displayed at all in the image drawing space in the worst case. Since the maximum and minimum coordinate values of the NC command program are obtained during the drawing process, however, when a predetermined command is input next for redrawing the tool locus or the like, it is drawn using a magnification and center coordinates such that the above maximum and minimum coordinate values will go in the image drawing space. Thus, the whole of the tool locus or the like can surely be drawn at least a second time.

DESCRIPTION OF THE PREFERRED EMBODIMENT

Figure 2:
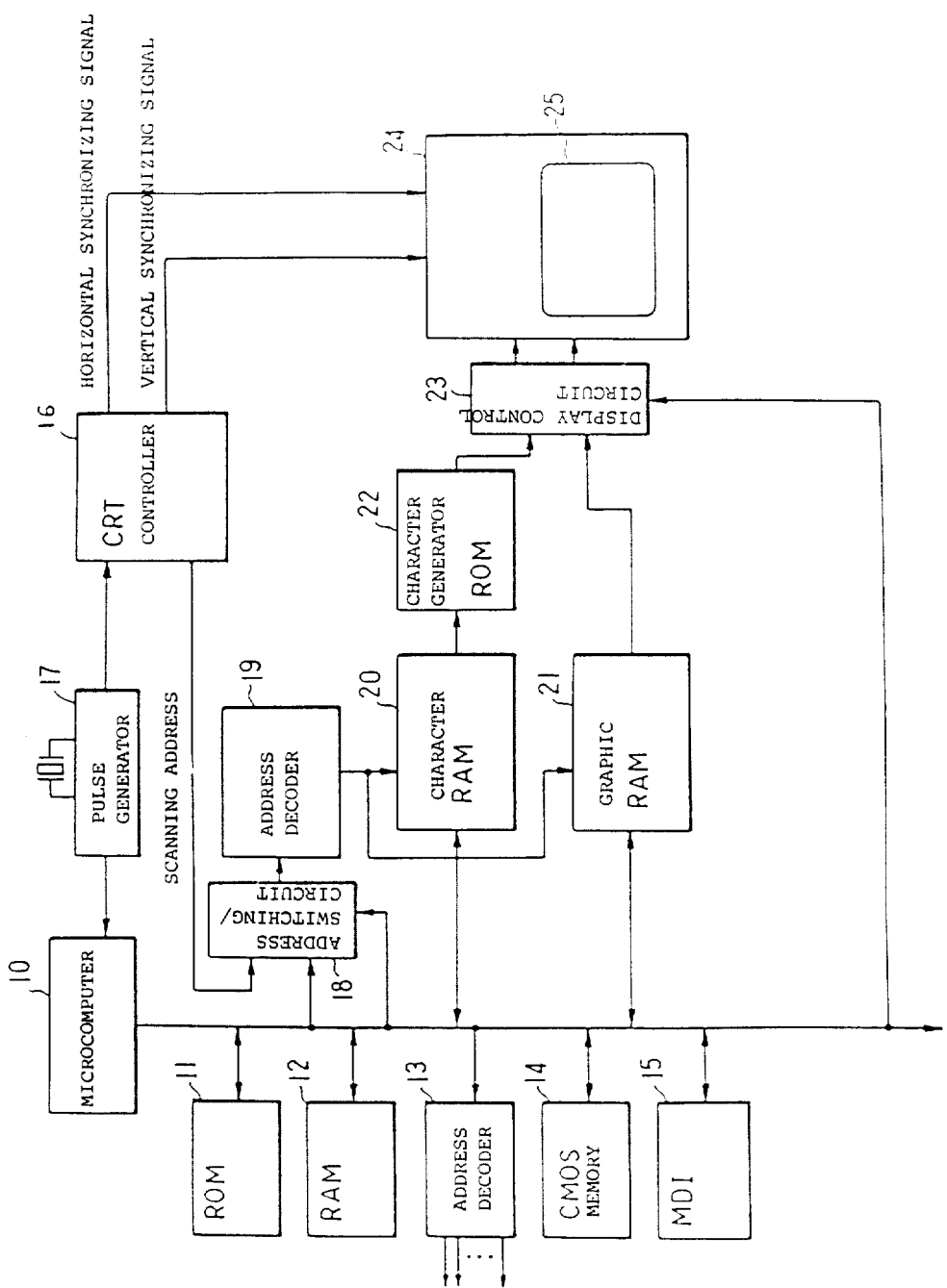
FIG. 2 is a block diagram of the principal part of numerical control equipment embodying the present invention.
Figure 3:
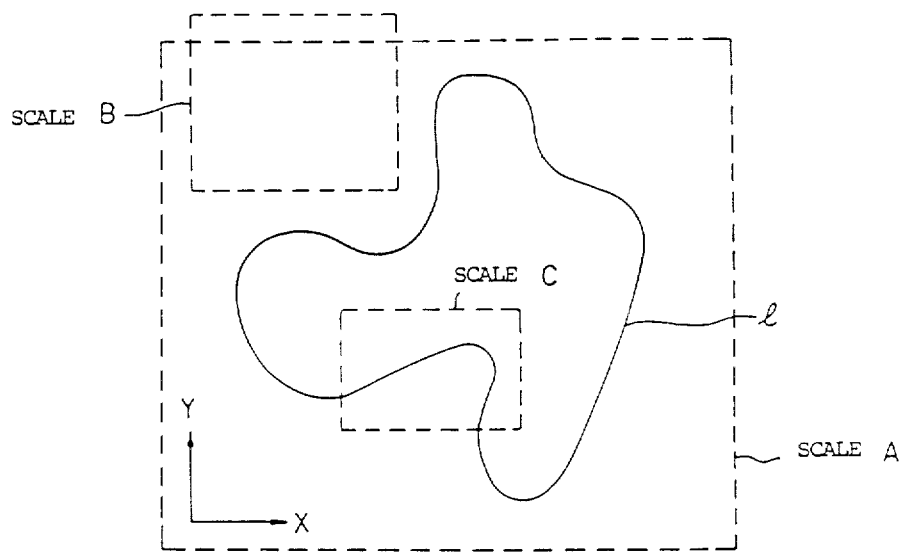
FIG. 3 is a diagram for explaining the relation between the locus of a tool or the like to be drawn and the scale for an image drawing space.

FIG. 2 is a block diagram of the principal part of numerical control equipment provided with a graphic display which embodies the present invention. Reference numeral 10 indicates a microcomputer, which is connected to peripheral circuits via buses such as data, address and control buses; 11 a ROM for storing a program or the like which is necessary for the microcomputer 10 to execute predetermined operations; 12 a RAM which is used for a pointer, a computation or the like; 13 an address decoder for accessing a memory or the like; 14 a CMOS memory (which may also be formed by a magnetic bubble memory) for storing NC command programs; 15 a manual decoder input device (MDI) provided on a front panel of NC equipment and having various keys; 16 a CRT controller for generating horizontal and vertical synchronizing signals and a scanning address; 17 a pulse generator; 18 an address switching circuit for switching between a CPU address and the scanning address from the CRT controller 16; 19 an address decoder; 20 a character RAM for storing display characters corresponding to the position on the display screen; 21 a graphic RAM having storage areas each corresponding to one display dot of the display screen; 22 a character generator ROM for converting the output of the character RAM 20 to character pattern data; 23 a display control circuit which provides a video signal based on the outputs of the character RAM 20 and the graphic RAM 21; 24 a display; and 25 a display screen.

The CMOS memory 14 has stored therein a plurality of NC command programs, and it is specified by modifying a set value which program is read out for displaying the locus of a tool. The set value is modified in a known manner. This is, set value modification data is displayed on the display screen 25 by pressing a set value modifying key of the MDI 15, and the number of a program desired for display is written from the MDI 15 into a program number insertion part in the set value modification data being displayed. The set value modification data further has parts at which to set a parameter for the image drawing plane, parameters for maximum and minimum values of an image to be drawn, a parameter for center coordinates of the image drawing space, a parameter for the drawing start point, a drawing start block, an end block and so forth, and such necessary data is set from the MDI 15. For example, when it is desired to display the locus of a tool in the XY plane, the number of the XY plane, for instance, "0" is set as the parameter for the image drawing plane, and when it is desired to display the tool locus in the YZ plane, "1" is set. As the maximum and minimum values for drawing, maximum and minimum values are set for each axis of the specified plane. Once the maximum and minimum values are thus set, the scale and the center coordinates of the image drawing space will be automatically determined. As the center coordinates of the image drawing space, the corresponding values in the coordinate system of a workpiece in a selected NC command program for which the locus of a tool or the like is to be drawn are set. When the abovesaid maximum and minimum values are already set, centers of these maximum and minimum values will automatically be set as the center coordinates of the image drawing space. As for the drawing start point, when G92 is not directed at the beginning of the selected NC command program, this set value will specify the start point, so that when a command such as G92 is not provided, a value in the coordinate system of the workpiece is set as the drawing start point. Further, the drawing starting and terminating blocks are set by specifying the program number and the sequence number.

Next, the operation of this embodiment will be described. For example, in the case of displaying on the displaying screen 25 the tool locus in an NC command program of a program number No. 1 stored in the CMOS memory 14, the MDI 15 is first operated to call up set value modification data onto the display screen 25, and No. 1 is set as the program number. In addition, the image drawing plane, the maximum and minimum values of an image to be drawn and the drawing start and end blocks are set. In this instance, the maximum and minimum values are provisional values that the operator considers appropriate. Upon completion of setting required parameters, a drawing start key on the MDI 15 is turned ON, starting the microcomputer 10 to execute the process shown in FIG. 1.

At first, the correspondence between coordinates of the drawing space and coordinates of the NC command program (the scale, the center coordinates of the image drawing space, etc.) is determined in accordance with the image drawing plane and the maximum and minimum values set as described above. Then preparations are made for newly obtaining maximum and minimum values of the NC command program (for example, setting, as the coordinates of the starting point, the provisional maximum and minimum values set as the parameters).

Next, one block of an NC command program corresponding to the program number set as the parameter, is read out of the CMOS memory 14 and its contents are analyzed to compute tool locus data, which is written into the graphic RAM 21. Furthermore, the position in the coordinate system of the program is updated in accordance with the contents of the program, and its coordinates are compared with the previous maximum and minimum values to compute maximum and minimum values of the program for each axis. In the drawings, MAX(a, b) is a symbol showing greater values of a and b and MIN(a, b) is a symbol showing smaller values of a and b. The above processing is continued until the specified NC command program comes to an end.

By continuing the above processing to the end of the specified NC command program, its tool locus on the provisional scale is stored in the graphic RAM 21. The microcomputer 10 switches the address switching circuit 18 to the scanning address side, by which the contents of the graphic RAM 21 are sequentially read out by the display control circuit 23, displaying the stored tool locus on the display screen 25.

Figure 1:
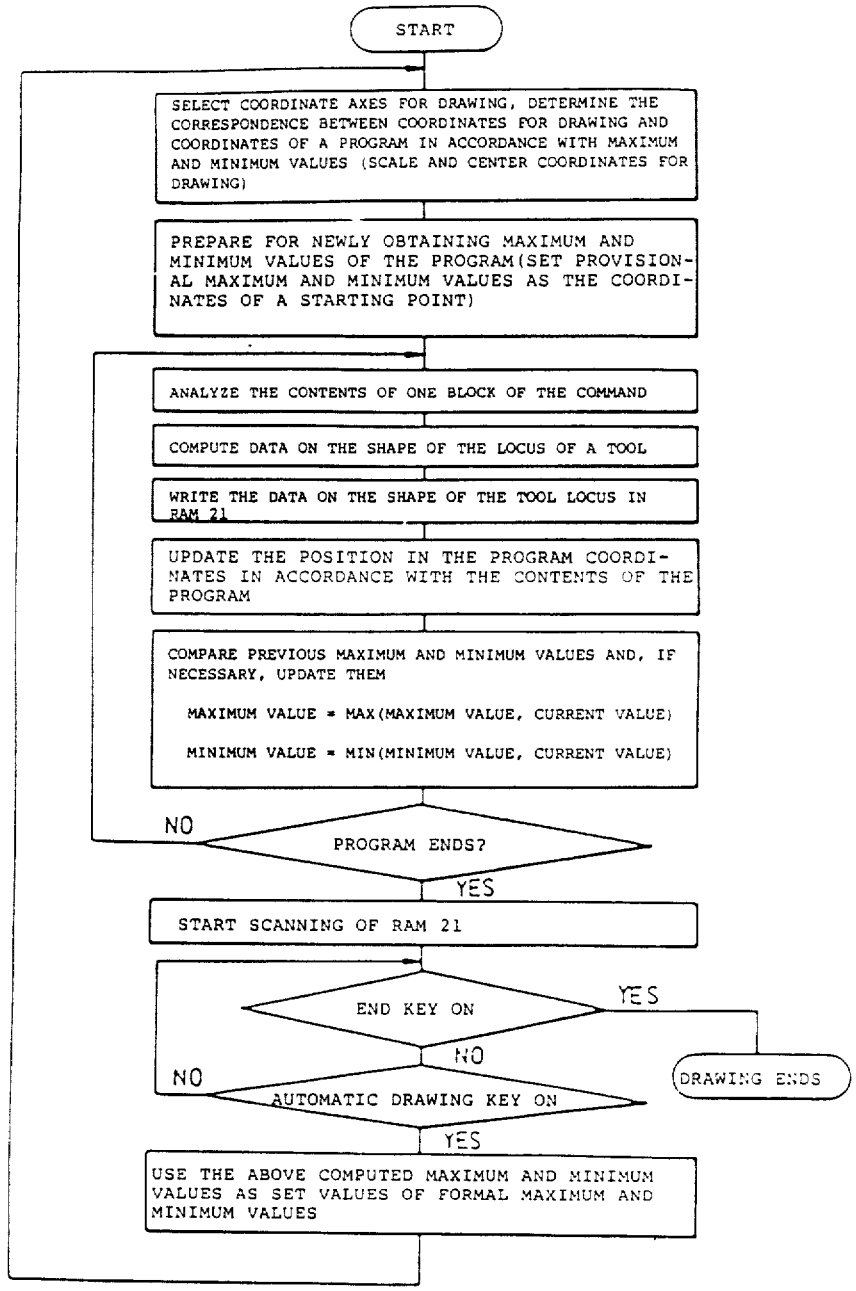
FIG. 1 is a flowchart showing the flow of processing according to an embodiment of the present invention.

When the display image is satisfactory, the operator can check the program while observing the display. In the case where nothing is displayed, or something is displayed but the required part is not displayed, or the required part is displayed but appropriate maximum and minimum values are difficult to obtain due to inappropriate setting of the provisional maximum and minimum values, it is necessary only to press an automatic drawing key of the MDI 15. In this second drawing processing, since the maximum and minimum values obtained in the preceding drawing processing are used as formal set values of the maximum and minimum values, as shown in the flowchart of FIG. 1, the tool locus is displayed using such a magnification and center coordinates that the whole of the tool locus in the specified NC command program will go in the specified image drawing space.

Incidentally, an arrangement which permits a selection of the aforementioned conventional methods 1 to 3 after the first drawing processing (the selection of the method 2 is virtually meaningless) will increase the degree of freedom in operation, and hence is preferable.

As described above, according to the present invention, if provisional maximum and minimum coordinate values first entered through a key input means are appropriate set values corresponding to a selected NC command program, then a satisfactory display image can be obtained by a single drawing process. Even when the set values are inappropriate, if the locus of a tool is displayed to some extent, the operator can obtain some information on the program. In addition, since the maximum and minimum coordinate values of the NC command program are obtained in the above drawing processing, when a predetermined command is input next for redrawing, the tool locus is displayed based on such a magnification and center coordinates that the thus obtained maximum and minimum coordinate values will go in the specified image drawing space. Thus, the tool locus or the like can surely be displayed in its entirety and an optimum scale for drawing can be set as quickly as possible.

What is claimed is:

1. A graphic display image drawing method for numerical control equipment which displays the locus of a tool on a display screen in accordance with the contents of a selected NC command program, comprising the steps of:
    (a) calculating a preliminary magnification for image drawing and preliminary center coordinates of an image drawing space so that provisional maximum and minimum coordinate values entered through a key input means will go in a specified image drawing space;
    (b) displaying the tool locus in the selected NC command program based on the preliminary magnification and the preliminary center coordinates;
    (c) obtaining actual maximum and minimum coordinate values contained in the selected NC command program simultaneously with said displaying step (b);
    (d) calculating a final magnification and final center coordinates of the image drawing space when a predetermined command is input after completion of said displaying step (b), so that the maximum and minimum coordinate values obtained during said step (c) will go in the image drawing space; and
    (e) displaying the tool locus in the selected program based on the final magnification and final center coordinates.

2. A graphic display method for numerical control equipment which displays a tool locus in accordance with the contents of an NC program, comprising the steps of:
    (a) setting required parameters for image drawing including maximum and minimum coordinate values for defining an image space for an image to be drawn;
    (b) reading the NC command program and revising the maximum and minimum coordinate values set in said substep (a) in dependence upon the coordinate data in the NC command program which is read;
    (c) automatically displaying the tool locus in the image space based on the maximum and minimum coordinate values set in said step (a); and
    (d) causing the tool locus to be displayed based on the revised minimum and maximum coordinate values determined in said step (b) when the entire tool locus is not displayed in the image space in said displaying step (c).

3. A graphic display method as set forth in claim 2, wherein said step (d) comprises generating an automatic drawing command, and displaying the tool locus based on the revised maximum and minimum coordinate values, so that the entire tool locus in the NC command program is displayed within the image space.

* * * * *

UNITED STATES PATENT AND TRADEMARK OFFICE
CERTIFICATE OF CORRECTION

PATENT NO. : 4,725,960
DATED : February 16, 1988
INVENTOR(S) : ATSUSHI SHIMA ET AL.

It is certified that error appears in the above-identified patent and that said Letters Patent is hereby corrected as shown below:

[57] ABSTRACT

Line 1, delete "The present invention is to enable" and insert --A method of enabling--;
Lines 4 & 5, no paragraph;
Line 8, "means" should be --device--;
Line 15, "means" should be --device--;
Line 17, delete "such";
Line 19, after "space" insert --, so--;
Lines 25 & 26, no paragraph;
Line 26, "Accordingly, when" should be --When--;
Line 27, "means" should be --device--;
Line 29, after "image" insert --provided--;
Line 32, after "through" insert --a--.

Column 1, line 41, "1" should be --$\ell$--;
line 43, "1" should be --$\ell$--.

Signed and Sealed this

Second Day of January, 1990

Attest:

JEFFREY M. SAMUELS

Attesting Officer    Acting Commissioner of Patents and Trademarks